S. J. RUSSELL.
APPARATUS FOR SHOVELING, LIFTING, CARRYING, AND DUMPING MATERIAL.
APPLICATION FILED NOV. 1, 1910.
1,012,713.
Patented Dec. 26, 1911.
3 SHEETS—SHEET 3.
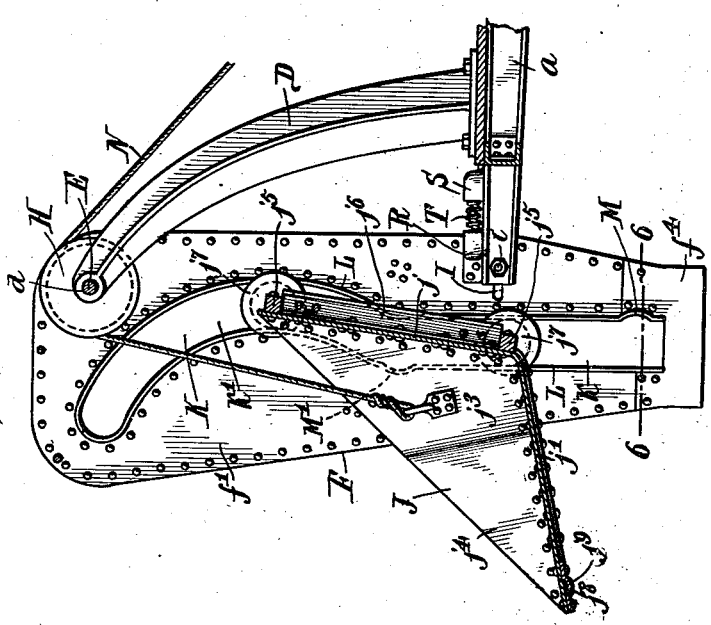
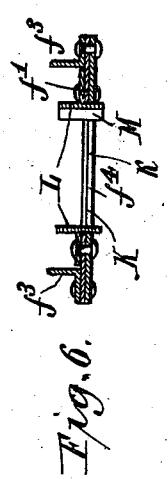
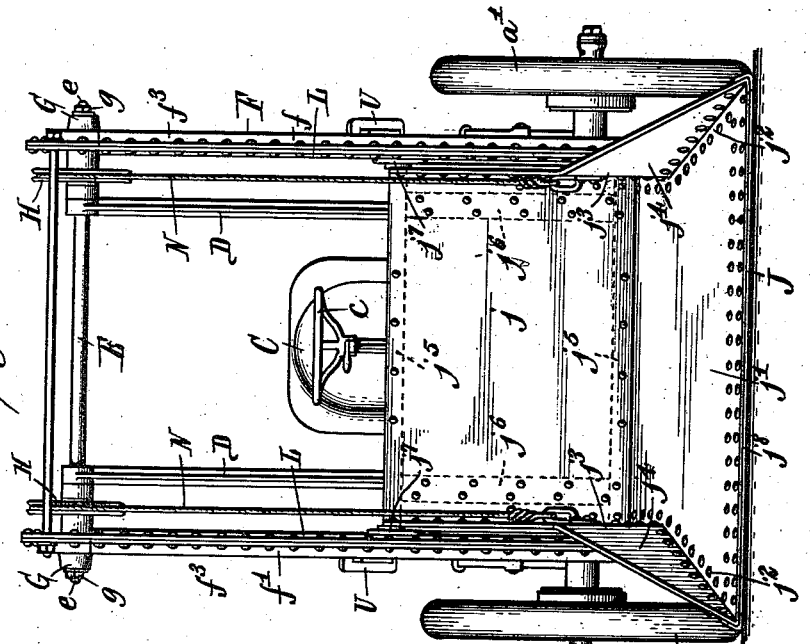
Witnesses:
Christ Finke, Jr.,
Jacob Oberst, Jr.
Samuel J. Russell, Inventor.
By Emil Neuhart
Attorney

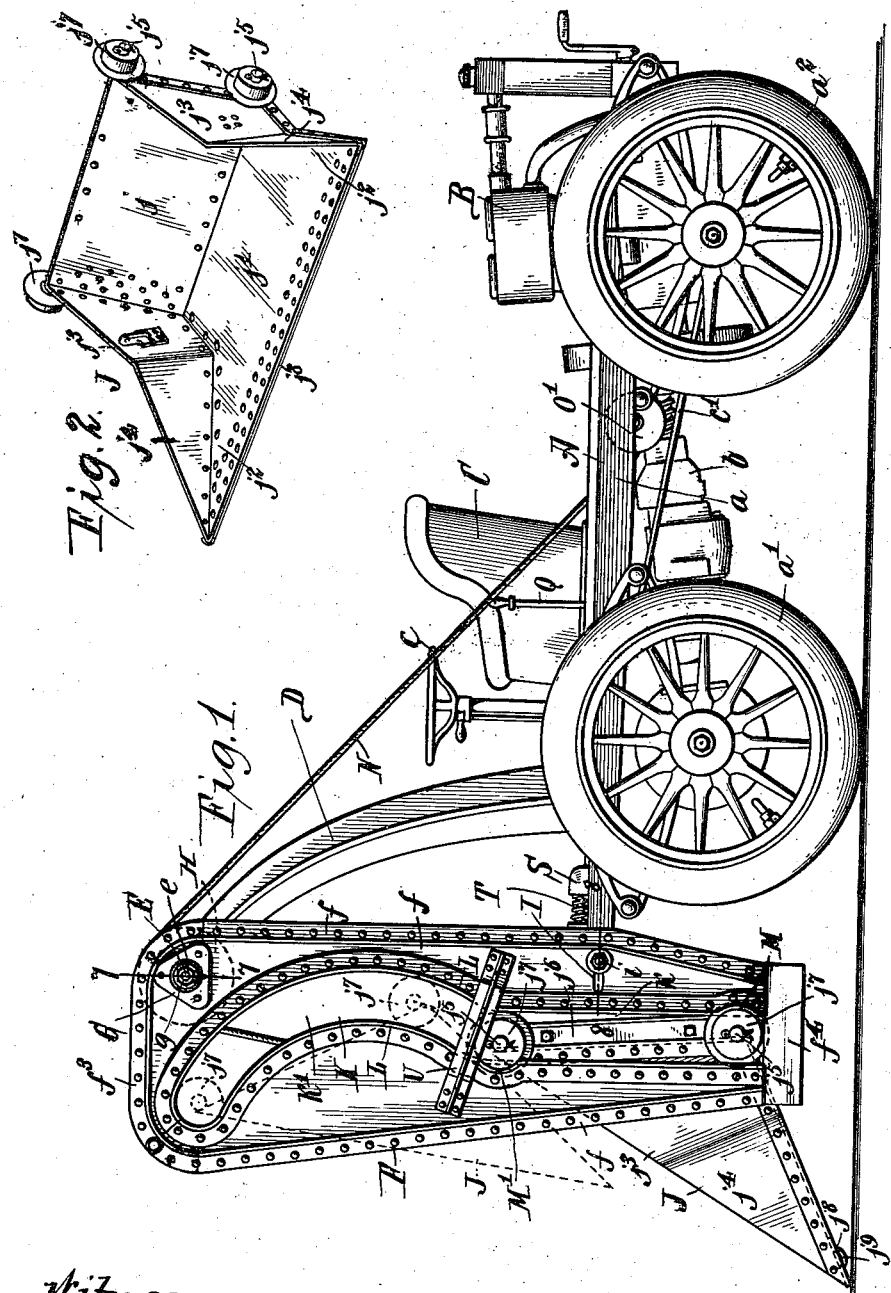

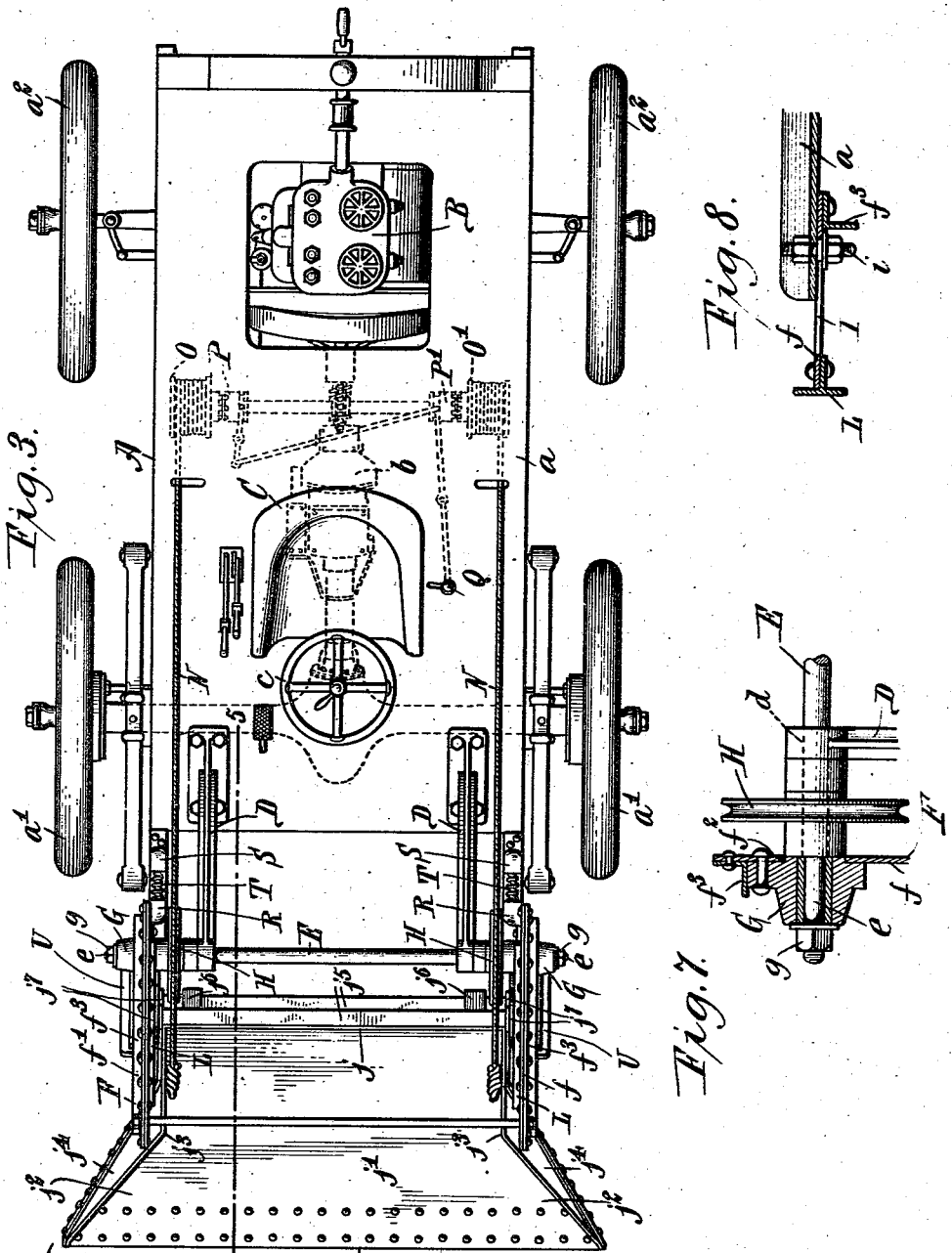

UNITED STATES PATENT OFFICE.

SAMUEL J. RUSSELL, OF BUFFALO, NEW YORK.

APPARATUS FOR SHOVELING, LIFTING, CARRYING, AND DUMPING MATERIAL.

1,012,713.  Specification of Letters Patent.  Patented Dec. 26, 1911.

Application filed November 1, 1910. Serial No. 590,116.

*To all whom it may concern:*

Be it known that I, SAMUEL J. RUSSELL, a citizen of the United States, residing at Buffalo, in the county of Erie and State of New York, have invented new and useful Improvements in Apparatus for Shoveling, Lifting, Carrying, and Dumping Material, of which the following is a specification.

My invention relates to an apparatus for shoveling, lifting, carrying, and dumping material, and more particularly to an apparatus of this type for use in boats designed for carrying bulk freight, such as ore, coal, and other material of a similar nature.

In unloading bulk freight such as iron ore, coal, and the like, the machinery for removing the bulk of the freight or cargo is situated outside of the boat and by means of suitable parts or adjuncts, the material is lifted through the various hatchways of the boat, and in the process of unloading, either the boat or the unloading apparatus must be moved, so that after the material is drawn up from a point beneath one hatchway, the boat and unloading apparatus are moved relatively so that the material can be drawn up through another hatchway. After the material within reach of the unloading implement, after working through all hatchways, has been removed from the regions beneath the various hatchways or within reach of the unloading implement, manual labor is resorted to for the purpose of shoveling or otherwise depositing the remaining inaccessible portion of the cargo into the regions where it can be unloaded by the unloading implement. This, however, is very laborious and expensive and exceedingly slow work and detains the boat at the wharf or dock, whereas it could be delivering a return cargo and increasing its annual capacity considerably, if unloaded in less time.

The primary object of my invention is to dispense with the manual labor required in shifting the remaining inaccessible portion of the cargo from its unapproachable location to points below hatchways, by means of a self-propelled shoveling, lifting, carrying and unloading apparatus Another object of my invention is the provision of a self-propelled apparatus capable of being lowered through a hatchway of a boat and of being propelled about on the cargo supporting floor of the hull of the boat, said apparatus having means for shoveling cargo, retaining cargo on the shovel, and after the apparatus is moved to the point desired, depositing the cargo at that point.

With these and other objects in view, my invention consists in a self-propelled vehicle provided with shoveling and dumping mechanism and with means for operating the vehicle and the said shoveling and dumping mechanism, and it also consists in the arrangement, and combination of devices and in the construction, arrangement, and combination of parts to be hereinafter described and particularly pointed out in the subjoined claims.

In the drawings:—Figure 1 is a side elevation of an apparatus representative of my invention. Fig. 2 is a detached perspective view of the shovel employed for shoveling, retaining, and dumping material. Fig. 3 is a plan view of the apparatus. Fig. 4 is a front view of the same. Fig. 5 is a vertical section taken on line 5—5, Fig. 3, the shovel being shown in a somewhat elevated position. Fig. 6 is an enlarged horizontal section through one of the side members of the shovel supporting-frame, taken on line 6—6, Fig. 5. Fig. 7 is an enlarged vertical section taken on line 7—7, Fig. 1, the cable sheave being shown in elevation. Fig. 8 is an enlarged horizontal section taken on line 8—8, Fig. 1.

Referring now to the drawings in detail, like letters of reference refer to like parts in the several figures.

The reference letter A represents a vehicle, in preferred form comprising a frame $a$ mounted on wheels $a^1$ $a^2$; the wheels $a^1$ being the driving-wheels which are located at the front end of the frame and the wheels $a^2$ being the steering-wheels located at the rear end of the frame. These wheels may be of any suitable construction and are preferably arranged close together to provide a short wheel-base so that the apparatus can be easily turned about in the hull of a boat. Located at the rear end of the frame is the power-mechanism, in the form of an engine or motor B, which provides the power for operating the apparatus. Suitable transmission mechanism $b$ is interposed between the driving-wheels $a^1$ and said power-mechanism. A seat C may be provided for the operator and a guiding-wheel $c$ arranged in such relation to the seat that the operator occupying the latter can conveniently steer the vehicle about, said guiding-wheel having connection with the steering wheels $a^2$ by means of a rod $c^1$, or otherwise.

The parts thus far described, constitute a power-driven or self-propelled vehicle, and rising from the front end of the frame A, are two supports D which are bolted or otherwise secured at their lower ends to said frame and are provided at their upper ends with alined openings $d$ through which a rod E is passed, said rod extending with opposite ends a suitable distance through said openings and having its extremities reduced in diameter, as at $e$, and threaded for a purpose to presently appear.

Suspended from the rod E is a shovel supporting-frame F comprising two side members $f$, $f^1$, each formed of sheet metal and having an opening $f^2$ near its upper end into which is fitted the boss of a casting G. These castings are riveted to the side members in a secure manner and through them are passed the reduced extremities $e$ of the rod E, which provide a secure support for the shovel supporting-frame. The side members of the said frame are held on the reduced extremities of said rod by means of nuts $g$ threaded onto the extremities of the rod E. Between each support D and the adjacent side member of the shovel supporting-frame, is rotatably mounted a cable sheave H. Each side member of the shovel supporting-frame E is reinforced around its top and side edges with angle iron stiffening-bars $f^3$ and has a removable section $f^4$ at its lower end suitably riveted to the upper portion by means of said stiffening bars. By suspending the shovel supporting-frame from the extremities of the rod E, it is permitted to oscillate; but to limit the extent of oscillation, the side members of the shovel supporting-frame are provided with alined slots I through which are passed bolts $i$ that are held in the wheeled frame $a$, the shovel supporting-frame being limited in its movements by the ends of said slots striking the bolts $i$.

J represents a shovel which is normally supported by the shovel supporting-frame F and is adapted for movement vertically thereon. This shovel comprises a rear wall $j$, an inclined bottom or shoveling wall $j^1$, widened at its front end, as at $j^2$, and sides $j^3$ flared at their front ends, as at $j^4$, to conform to the widened front end of the bottom or shoveling wall $j^1$. Secured to the back $j$ of said shovel, are two transverse bars $j^5$, one arranged at the upper end of the back and the other at the lower end thereof, and between these bars are arranged a pair of vertical stiffening bars $j^6$, preferably I-beams. The transverse bars $j^5$ have cylindrical ends on which are mounted for rotation guide-wheels $j^7$ arranged in pairs at each side and which travel in guide-slots K formed in the side members of the shovel supporting-frame. At the front end of the bottom or shoveling wall $j^1$, I secure a wear-plate $j^8$, the same being riveted to the underside of said wall and having a raised intermediate portion $j^9$ which serves to guide the shovel for movement over the floor during its shoveling action. Each guide-slot K has a vertical or substantially vertical lower straight portion $k$ and a curved upper portion $k^1$ and the edges of these slots are faced with T-shaped bars L riveted or otherwise suitably secured to the side-members to form tracks, the lower ends of said bars extending onto the removable lower sections $f^4$ of the side members to which they are riveted, thus aiding to securely hold said sections to the upper portions of said side members. The T-shaped bars provide extended track surfaces for the guide-wheels $j^7$ and are capable of withstanding considerable strain. The rear wall of each slot is provided with a notch at its lower end, as at M, and the front wall of each slot has a similar notch $M^1$ in a higher plane; and when the shovel J is in normal position, the lower pair of guide wheels thereon engage the notches M while the upper pair of guide wheels engage the notches $M^1$, thus offering resistance to the raising of the shovel. The purpose of these notches is to prevent the shovel rising in its guide-slots during the act of shoveling material, as the resistance placed against the front end of the shovel has a tendency to raise the rear of the same.

The shovel is elevated by means of cables N secured thereto and passing up and over the cable sheaves H, thence down and around drums O, $O^1$, carried by the wheeled frame. These drums are operatively connected with the power mechanism B and by means of suitable clutches P, $P^1$ may be thrown out of operative connection, said clutches being actuated in any suitable manner by means of a lever Q arranged within convenient reach of the operator. As there is considerable resistance placed against the shovel when the vehicle is propelled forward against the material to be shoveled, the shovel supporting-frame is caused to swing on the rod E, and although the extent of its movement is limited by the slots I in the side members thereof, I deem it desirable to provide means for yieldingly taking up the jar which the apparatus would be subjected to by coming suddenly in contact with the material to be shoveled; and for this purpose spring-receiving pockets R in the form of castings are secured to the side members of the shovel supporting-frame and similar pockets S to the wheeled frame and in these pockets I place the ends of buffer-springs T. At a point between the ends of the guide-slots K, I provide yokes U, one end of each being secured to the side member in front of the slot and the other end in rear of the slot, thus preventing buckling of the side members and the forcing of the walls of the slots together under the strain to which the apparatus is subjected while in the action of shoveling.

When the shovel is in its normal position shown in Fig. 1, the front edge thereof is in contact or almost in contact with the floor, and with the shovel in this position, the vehicle is propelled forward to take up a shovel full of the material. The operator then stops the vehicle allowing the engine to run idle, he next throws in the clutches P, P¹, to cause rotation of the drums O, O¹, whereupon the shovel is raised in the shovel supporting-frame and when it reaches the position shown in Fig. 5, the clutches P, P¹ are thrown out and the drums held against movement in any suitable manner. When the shovel is in the position shown in Fig. 5, the material is held thereon by reason of the shovel having been tilted backward slightly. The operator then places the driving wheels of the vehicle in action and causes the vehicle to be propelled to the point where he desires to dump the material. When this point is reached, he stops the vehicle and again throws the clutches P, P¹ into coaction, causing the drums O, O¹ to rotate, thus elevating the shovel from the position shown in Fig. 5 to that shown in dotted lines in Fig. 1. By reason of the guide-wheels $j^7$ of the shovel following the upper curved portion of the track, the shovel is caused to tilt forwardly, thus giving the bottom of the shovel a greater inclination and compelling the material carried thereon to be dumped.

It will be noted that when the shovel is in normal position the bottom is inclined forwardly and the rear wall also inclines forwardly a trifle. Upon elevating the shovel a distance, after having a load of material, the upper guide wheels travel upwardly and slightly rearward until they reach the rearmost points of the guide-slots, thus tilting the shovel to recline the back thereof rearwardly and to bring the bottom thereof into a position more closely approaching the horizontal; and when in this position, the material is retained on the shovel. Now upon drawing the shovel upward to its highest position, the upper guide-wheels $j^7$ thereof travel forward and the lower guide wheels travel rearward thus tilting the shovel to a position where the material can no longer be retained thereon. This advantage is obtained by the relative position of the guide-wheels on the shovel and the formation of the guide-slots. It is apparent, however, that other means for accomplishing the same purpose may be resorted to and I do not wish to limit myself to details of construction or formation of parts as I desire the subjoined claims to be given the broadest interpretation permissible by the prior art.

Having thus described my invention, what I claim is,—

1. In an apparatus of the kind described, the combination of a wheeled frame having upwardly-directed supports, a shovel supporting-frame hung from said supports so as to slightly oscillate, said shovel supporting frame having longitudinally disposed guiding-means, a shovel vertically movable within said shovel supporting-frame and having means coöperating with said guiding-means, said guiding-means serving to cause said shovel to tilt as it approaches the end of its upward movement, and power-mechanism carried by said wheeled frame and adapted to propel the latter and also to elevate said shovel.

2. In an apparatus of the kind described, the combination of a wheeled frame having upwardly-directed supports, a shovel supporting-frame comprising two separated side members hung from said support so as to slightly oscillate thereon, means for limiting the oscillating movement of said shovel supporting-frame, a shovel guided for movement lengthwise of said shovel supporting-frame, means on said shovel supporting-frame for causing said shovel to tilt at a certain point in its movement, and power-mechanism carried by said wheeled frame and adapted to propel the same and also to operate said shovel.

3. In an apparatus of the kind described, the combination of a wheeled frame having upwardly-directed supports at one end, a rod passing through the upper ends of said supports, a shovel supporting-frame mounted on said rod and comprising two separated side members, cable sheaves rotatable on said rod, a shovel guided for movement between the side members of said shovel supporting-frame, cables connected to said shovel and passing over said cable sheaves, means on said wheeled frame for winding up and paying out said cables, and power-mechanism also on said wheeled frame for operating said means.

4. In an apparatus of the kind described, the combination of a shovel supporting-frame having longitudinally disposed guiding-means, a shovel coöperating with said frame and comprising a rear wall, a bottom wall widened toward its front edge and side walls connecting the side edges of said bottom with the ends of said rear wall, said side walls being flared outward toward their front ends, a transverse bar secured to the rear wall of said shovel at or near its upper end, a second transverse bar also secured to the rear wall of said shovel near its lower end, guide wheels rotatable on said transverse bar and coöperating with the guiding-means on said shovel supporting-frame, and means for raising said shovel.

5. In an apparatus of the kind described, the combination of a supporting-frame comprising two spaced vertically-disposed members having longitudinal guide-slots, each slot having a lower vertical portion and an upper curved portion and having also a notch in its rear wall and a notch in its front wall in a plane above the notch in said rear wall, and a shovel movable between the spaced members of said frame and having a pair of guide-wheels at each side adapted to travel in said slots, one guide wheel of each pair being above the other, the lower guide-wheels normally engaging the notches in the rear walls of said slots and the upper guide-wheels normally engaging the notches in the front walls of said slots.

6. The combination of a wheeled frame, a shovel supporting-frame carried by said wheeled frame so as to slightly oscillate thereon, said shovel supporting-frame comprising two spaced side members having alined slots, bolts held to said wheeled frame and passing through said alined slots, buffer springs between said wheeled frame and said shovel supporting-frame, a shovel guided for movement longitudinally in said shovel supporting-frame and assuming a position for shoveling when at its lower end, means on said wheeled frame for elevating said shovel, and means on said shovel supporting-frame for tilting the shovel to dump its load when traveling through the upper portion of its movement.

In testimony whereof I have affixed my signature in the presence of two subscribing witnesses.

SAMUEL J. RUSSELL.

Witnesses:
EMIL NEUHART,
ELLA C. PLUECKHAHN.